(12) United States Patent
Wang

(10) Patent No.: US 9,965,111 B2
(45) Date of Patent: May 8, 2018

(54) IN-CELL TOUCH SCREEN AND DISPLAY APPARATUS

(71) Applicant: BOE Technology Group Co., Ltd., Beijing (CN)

(72) Inventor: Xinxing Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 44 days.

(21) Appl. No.: 14/435,344

(22) PCT Filed: Mar. 27, 2014

(86) PCT No.: PCT/CN2014/074213
§ 371 (c)(1),
(2) Date: Apr. 13, 2015

(87) PCT Pub. No.: WO2015/117288
PCT Pub. Date: Aug. 13, 2015

(65) Prior Publication Data
US 2016/0011688 A1    Jan. 14, 2016

(30) Foreign Application Priority Data

Feb. 8, 2014   (CN) .......................... 2014 1 0045591

(51) Int. Cl.
*G06F 3/045* (2006.01)
*G06F 3/041* (2006.01)
(Continued)

(52) U.S. Cl.
CPC ............ *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC .................... G06F 3/044; G06F 3/041; G06F 2203/04112; G06F 2203/04111
(Continued)

(56) References Cited

U.S. PATENT DOCUMENTS

2008/0062148 A1* 3/2008 Hotelling ............ G02F 1/13338
                                                                345/174
2012/0062510 A1* 3/2012 Mo ........................ G06F 3/044
                                                                345/174
(Continued)

FOREIGN PATENT DOCUMENTS

CN   103049156 A   4/2013
CN   103268036 A   8/2013
(Continued)

OTHER PUBLICATIONS

First Office Action, including Search Report, for Chinese Patent Application No. 201410045591.4, dated Feb. 29, 2016, 12 pages.
(Continued)

*Primary Examiner* — Amit Chatly
(74) *Attorney, Agent, or Firm* — Westman, Champlin & Koehler, P.A.

(57) ABSTRACT

Disclosed are an In-Cell touch screen and a display apparatus, the In-Cell touch screen comprising: an array substrate; an opposed substrate arranged to be opposed to the array substrate; a conductive black matrix provided on one side of the array substrate facing the opposed substrate or on one side of the opposed substrate facing the array substrate. The black matrix comprises a plurality of first touch electrodes and a plurality of second touch electrodes arranged to be insulated from each other and alternate with each other, one of the first touch electrode and the second touch electrode is applied with a touch scan signal, and the other one of the first touch electrode and second touch electrode is coupled with the touch scan signal and outputs a touch (Continued)

sensing signal. No separate touch electrode made of ITO material is required, and a pattern of the black matrix is provided in a non-opening region of the pixels, thus the light transmittance of the display apparatus can be prevented from being adversely affected by the touch electrode. Further, a mutual capacitance in a thickness direction of the touch screen is avoided, thus the touch sensitivity of the In-Cell touch screen can be improved.

14 Claims, 5 Drawing Sheets

(51) Int. Cl.
G02F 1/1335 (2006.01)
G06F 3/044 (2006.01)
(58) Field of Classification Search
USPC .......................................................... 345/173
See application file for complete search history.

(56) References Cited

U.S. PATENT DOCUMENTS

| | | | | |
|---|---|---|---|---|
| 2012/0105337 A1* | 5/2012 | Jun | ...................... | G06F 3/0412 345/173 |
| 2013/0293498 A1* | 11/2013 | Kim | ...................... | G06F 3/0412 345/173 |
| 2013/0335365 A1* | 12/2013 | Kim | ...................... | G06F 3/044 345/174 |
| 2014/0078420 A1* | 3/2014 | Liu | ...................... | G06F 3/0412 349/12 |
| 2014/0333582 A1* | 11/2014 | Huo | ...................... | G02F 1/13338 345/174 |

FOREIGN PATENT DOCUMENTS

| | | |
|---|---|---|
| CN | 103294273 A | 9/2013 |
| CN | 203706176 U | 7/2014 |

OTHER PUBLICATIONS

English translation of Box No. V of the Written Opinion of the International Searching Authority for International Application No. PCT/CN2014/074213, filed on Mar. 27, 2014, 3 pages.
International Search Report and Written Opinion for PCT Application No. PCT/CN2014/074213, dated Mar. 27, 2014, 8 pages.
Second Office Action for Chinese Patent Application No. 201410045591.4, dated Jul. 19, 2016, 13 pages.
Rejection Decision for Chinese Patent Application No. 201410045591.4, dated Feb. 28, 2017, 13 pages.
Third Office Action for Chinese Patent Application No. 201410045591.4, dated Nov. 16, 2016, 14 pages.

* cited by examiner ously. Moreover, with the
IN-CELL TOUCH SCREEN AND DISPLAY APPARATUS

CROSS-REFERENCE TO RELATED APPLICATION

This Application is a Section 371 National Stage Application of International Application No. PCT/CN2014/074213, filed Mar. 27, 2014, which has not yet published, which claims priority to Chinese Application No. 201410045591.4, filed Feb. 8, 2014, in Chinese, the contents of which are hereby incorporated by reference in their entirety.

BACKGROUND OF THE INVENTION

Field of the Invention

Embodiments of the present invention relate to a display apparatus, and particularly, to an In-Cell touch screen and a display apparatus.

Description of the Related Art

With rapid development of display technology, a touch screen (Touch Screen Panel) has been widely used in people' life. Currently, the touch screen may be classified, according to configurations thereof, an Add-on mode touch screen (Add-on Mode Touch Panel), On-Cell touch screen (On-Cell Touch Panel), and In-Cell touch screen (In-Cell Touch Panel). The Add-on mode touch screen is formed by separately manufacturing a touch screen and a liquid crystal display (LCD) screen and then joining the touch screen and the liquid crystal display (LCD) screen together to make a liquid crystal display (LCD) screen having a touch function. The Add-on mode touch screen has disadvantages such as a high manufacturing cost, a lower light transmittance, a larger thickness for an assembled module, and the like. For an In-Cell touch screen, a touch electrode of the touch screen is embedded inside the liquid crystal display screen, which not only reduces the entire thickness of the assembled module, but also greatly reduces manufacturing cost of the touch screen. Thus, an In-Cell touch screen has become popular in various panel manufacturers.

Presently, an existing capacitance type In-Cell touch screen is implemented by adding touch scan lines and touch sensing lines directly on an existing TFT (Thin Film Transistor) array substrate. That is, two layers of strip electrodes are manufactured, on a surface of the TFT array substrate. The two layers of strip electrodes are located in different planes and the strip electrodes in the two layers intersect with each other and serve as the touch drive lines and touch sensing lines of the touch screen respectively. A mutual capacitance is formed at an intersection between two strip electrodes located in different planes. Operational principle of the capacitance type In-Cell touch screen is described as follows: while a driving signal is applied to an electrode used as the touch drive line, a voltage signal of the touch sensing line induced by the mutual capacitance is detected. During this period, when a human body contacts the touch screen, a body electric field will act on the mutual capacitance and a capacitance value of the mutual capacitance will change and thus the induced voltage signal on the touch sensing line will change. Therefore, a touch position can be determined according to a change of the voltage signal on the touch sensing line.

With the above configuration of the capacitance type In-Cell touch screen, it is required to add new film layers on the existing TFT array substrate, and thus new manufacturing processes are required when the TFT array substrate is manufactured. Therefore the manufacturing cost is increased and the production efficiency is reduced. Moreover, with the above configuration of the capacitance type In-Cell touch screen, the touch scan lines and touch sensing lines are typically made of indium tin oxide (ITO), the light transmittance of the ITO, however, is only 60-80%. Thus, this touch technology is not adapted to be used in a high resolution product.

SUMMARY OF THE INVENTION

Embodiments of the present invention provides an In-Cell touch screen and a display apparatus, which realize a reduced manufacturing cost, a higher production efficiency and a higher light transmittance.

According to one embodiment of the present invention, there is provided an In-Cell touch screen, comprising:

an array substrate;

an opposed substrate arranged to be opposed to the array substrate;

a conductive black matrix provided on one side of the array substrate facing the opposed substrate or on one side of the opposed substrate facing the array substrate;

wherein, the black matrix comprises a plurality of first touch electrodes and a plurality of second touch electrodes arranged to be insulated from each other and alternate with each other, wherein when one of the first touch electrode and the second touch electrode is applied with a touch scan signal, the other one of the first touch electrode and the second touch electrode is coupled with the touch scan signal and outputs a touch sensing signal.

In the above In-Cell touch screen according to the above embodiment of the present invention, the black matrix is divided into the first touch electrodes and the second touch electrodes arranged to be insulated from each other and alternate with each other. That is, the black matrix is used as the first touch electrode and the second touch electrode of the present invention. Because the black matrix is used to realize touch function, no separate touch electrode made of ITO material is required, and a pattern of the black matrix is provided in a non-opening region of the pixels, the light transmittance of the display apparatus can be prevented from being adversely affected by the touch electrode.

Further, in the In-Cell touch screen provided according to the embodiment of the present invention, since the first touch electrodes and the second touch electrodes are formed by dividing the black matrix located in the same layer, a direct facing area between the first touch electrodes and the second touch electrodes can be avoided in a thickness direction of the touch screen. As such, a mutual capacitance formed by the direct facing area is reduced, so that a proportion of an amount of change in the mutual capacitance, which is caused by a finger touch operation, is increased, and a touch sensitivity of the In-Cell touch screen is improved.

In the above In-Cell touch screen, each first touch electrode and each second touch electrode have a mesh structure comprising a plurality of sub-squares respectively corresponding to a plurality of pixel unit formed on the array substrate and arranged in a matrix.

In the above In-Cell touch screen, one of the first touch electrode and the second touch electrode extends in a row direction or a column direction of the pixel units.

In the above In-Cell touch screen, each of the first touch electrodes comprises a plurality of first touch sub-electrodes which are independent of each other and arranged to alternate with the second touch electrodes; and a plurality of the first touch sub-electrodes, which belong to the same one first touch electrode and are located on either side of the second touch electrode are electrically connected with each other by first bridging lines.

In the above In-Cell touch screen, the black matrix is located on the one side of the array substrate facing the opposed substrate; the array substrate further comprises gate lines extending in the row direction of the pixel units; and an extending direction of the first bridging lines is the same as that of the gate lines.

In the above In-Cell touch screen, the first bridging lines and the gate lines are arranged on the same layer, thereby simplifying manufacturing processes and saving manufacturing cost.

In the above In-Cell touch screen, the second touch electrodes comprises a plurality of second touch sub-electrodes which are independent of each other and arranged to alternate with the first touch electrodes; and a plurality of the second touch sub-electrodes, which belong to the same one second touch electrode and are located on either side of the first touch electrode are electrically connected with each other by second bridging lines.

In the above In-Cell touch screen, the black matrix is located on the one side of the array substrate facing the opposed substrate; the array substrate further comprises data lines extending in the column direction of the pixel units; and an extending direction of the second bridging lines is the same as that of the data lines.

In the above In-Cell touch screen, the second bridging lines and the data lines are arranged on the same layer. As such, manufacturing processes may be simplified, and the manufacturing cost may be saved.

The In-Cell touch screen further comprises color filters located on the one side of the array substrate facing the opposed substrate and on the one side of the opposed substrate facing the array substrate.

In the above In-Cell touch screen, a time period for which the In-Cell touch screen displays one frame is divided into a touch time period and a display time period, and in the touch time period, one of the first touch electrode and the second touch electrode is applied with a touch scan signal, so that the other one is coupled with the touch scan signal and outputs a touch sensing signal.

According to a further embodiment of the present invention, there is provided a display apparatus comprising the In-Cell touch screen according to any one of the above embodiments of the present invention.

DETAILED DESCRIPTION OF PREFERRED EMBODIMENTS OF THE INVENTION

Figure 1A:
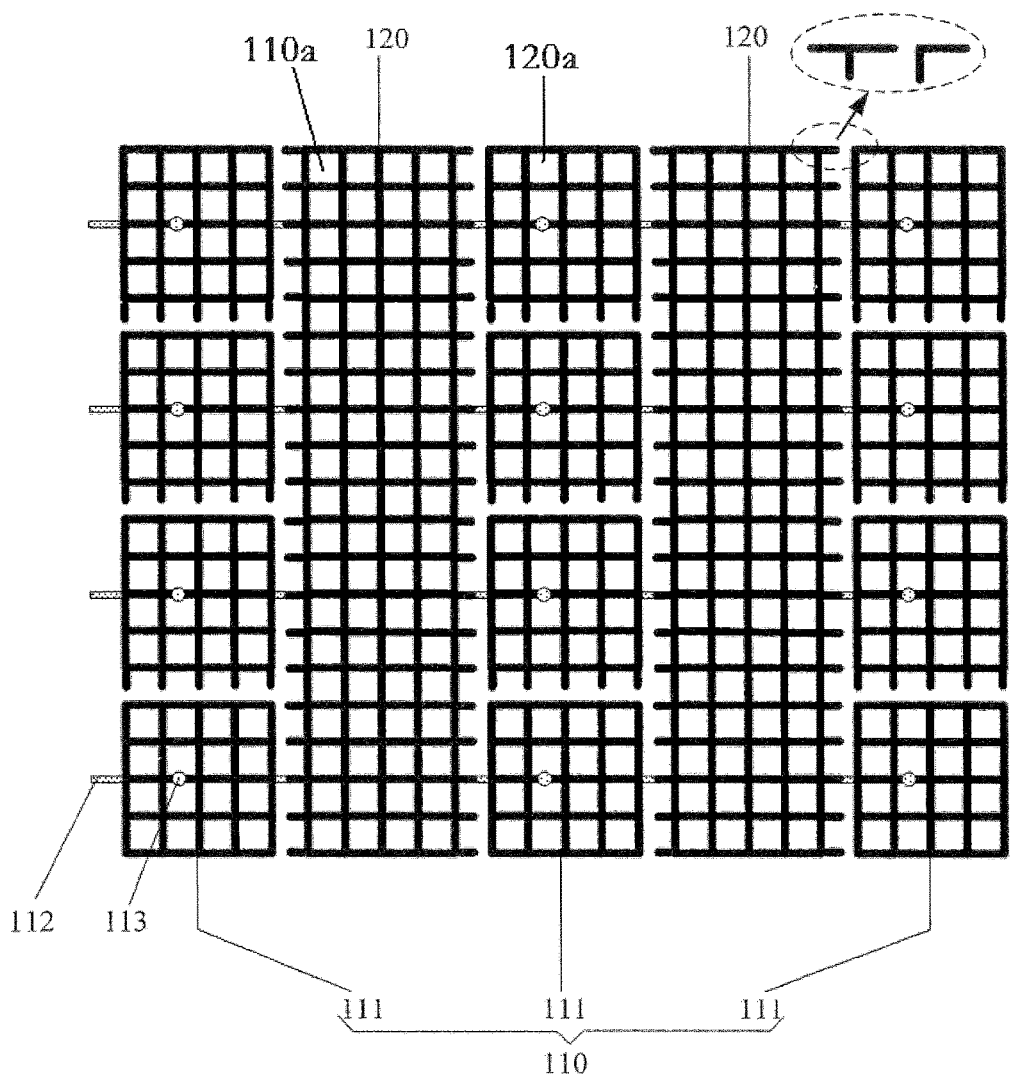
FIG. 1a is a principle schematic diagram showing an arrangement of touch electrodes of an In-Cell touch screen according to a first exemplary embodiment of the present invention.

Specific implementations of the In-Cell touch screen and display apparatus provided according to the present invention will be described hereinafter in detail in conjunction with the attached drawings. It should be understood by those skilled in that the inventions described herein may be modified while obtaining the technical effects of the present invention. Thus, the description is a general reveal for those skilled in the art and is not intended to limit the exemplary embodiments described in the present invention. Shapes and thicknesses of respective film layers shown in the drawings are not scaled to the real proportion, but only to illustrate the disclosure. In the attached drawings, the like reference numerals refer to the like elements.

According to a general inventive concept of the present invention, there is provided an In-Cell touch screen, comprising: an array substrate; an opposed substrate arranged to be opposed to the array substrate; a conductive black matrix provided on one side of the array substrate facing the opposed substrate or on one side of the opposed substrate facing the array substrate. The black matrix comprises a plurality of first touch electrodes and a plurality of second touch electrodes arranged to be insulated from each other and alternate with each other. When one of the first touch electrode and the second touch electrode is applied with a touch scan signal, and the other one of the first touch electrode and second touch electrode is coupled with the touch scan signal and outputs a touch sensing signal.

An In-Cell touch screen, according to one exemplary embodiment of the present invention, comprises an array substrate and an opposed substrate arranged to be opposed to each other. A black matrix having a conductive function is provided on one side of the array substrate facing the opposed substrate. In one alternative embodiment, a black matrix having a conductive function is provided on one side of the opposed substrate facing the array substrate.

FIG. 1a is a principle schematic diagram showing an arrangement of touch electrodes of an In-Cell touch screen according to a first exemplary embodiment of the present invention. As shown in FIG. 1a, a black matrix comprises a plurality of first touch electrodes 110 and a plurality of second touch electrodes 120 arranged to be insulated from each other and alternate with each other in a longitudinal direction (a right and left direction in FIG. 1a, or a row direction of pixel units), and each first touch electrode 110 and each second touch electrode 120 have a mesh structure. The mesh structure formed on the black matrix comprises a plurality of sub-squares 110a and 120a, which respectively define a plurality of pixel units (not shown) formed on the array substrate and arranged in a matrix.

Figure 1B:
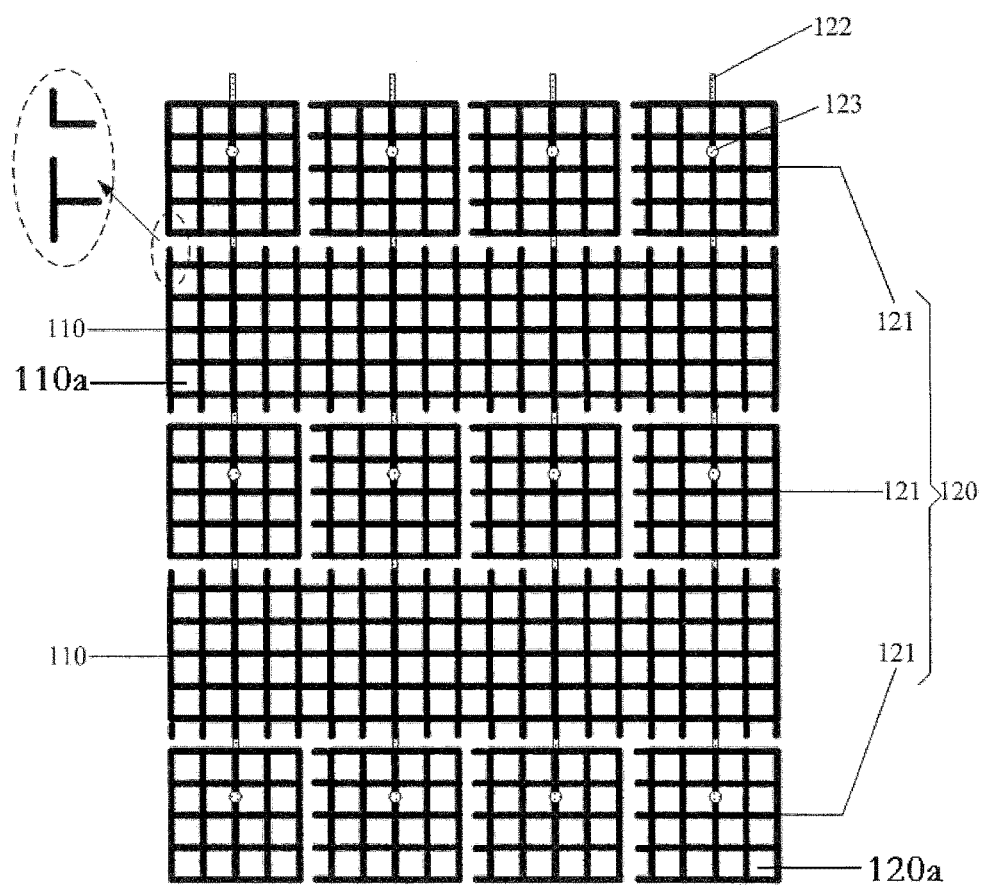
FIG. 1b is a principle schematic diagram showing an arrangement of touch electrodes of an In-Cell touch screen according to a second exemplary embodiment of the present invention.

FIG. 1b is a principle schematic diagram showing an arrangement of touch electrodes of an In-Cell touch screen according to a second exemplary embodiment of the present invention. As shown in FIG. 1b, a black matrix comprises a plurality of first touch electrodes 110 and a plurality of second touch electrodes 120 arranged to be insulated from each other and alternate with each other in a transversal direction (an up and down direction in FIG. 1b, or a column direction of pixel units). Each first touch electrode 110 and each second touch electrode 120 have a mesh structure. The mesh structure formed on the black matrix comprises a plurality of sub-squares 110a and 120a, which respectively define a plurality of pixel units (not shown) formed on the array substrate and arranged in a matrix.

In one operation mode of the In-Cell touch screen according to the present invention, the first touch electrodes 110 are applied with touch scan signals, and the second touch electrodes are coupled with the touch scan signals and output touch sensing signals. In another alternative operation mode, the second touch electrode 120 are applied with touch scan signals, and the first touch electrode 110 is coupled with the touch scan signals and outputs touch sensing signals.

In the above In-Cell touch screen provided according to the above embodiment of the present invention, the black matrix is divided into the first touch electrodes and the second touch electrodes arranged to be insulated from each other and alternate with each other. That is, besides a light shielding function, the black matrix is also used as the first touch electrodes and the second touch electrodes. Since a touch function is achieved by the black matrix in the touch screen provided according to the embodiment of the present invention, no separate touch electrode made of ITO material is required; further, a pattern of the black matrix is provided in a non-opening region of the pixels, the light transmittance of the display apparatus can be prevented from being adversely affected by the touch electrode.

Further, in the In-Cell touch screen provided according to the embodiment of the present invention, since the first touch electrodes and the second touch electrodes are formed by dividing the black matrix located in the same layer, a direct facing area can be avoided in a thickness direction of the touch screen. As such, a mutual capacitance formed by the direct facing area is reduced, so that a proportion of an amount of change in the mutual capacitance, which change is caused by a finger touch operation, is increased, and a touch sensitivity of the In-Cell touch screen is improved.

Specifically, in the above In-Cell touch screen provided according to an embodiment of the present invention, as shown in FIG. 1a and FIG. 1b, the black matrix is generally divided at positions corresponding to gaps between the pixel units into the desired first touch electrodes 110 and second touch electrodes 120 (partially enlarged views of the divided positions are illustrated within dashed boxes indicated by arrows shown in FIG. 1a and FIG. 1b).

In one exemplary embodiment, the first touch electrode 110 may be used as a touch sensing electrodes Rx, and the second touch electrode 120 may be correspondingly used as a touch drive electrodes Tx. In one alternative embodiment, the first touch electrode 110 may also be used as a touch drive electrode Tx, and second touch electrode 120 may be correspondingly used as a touch sensing electrode Rx.

Figure 2A:
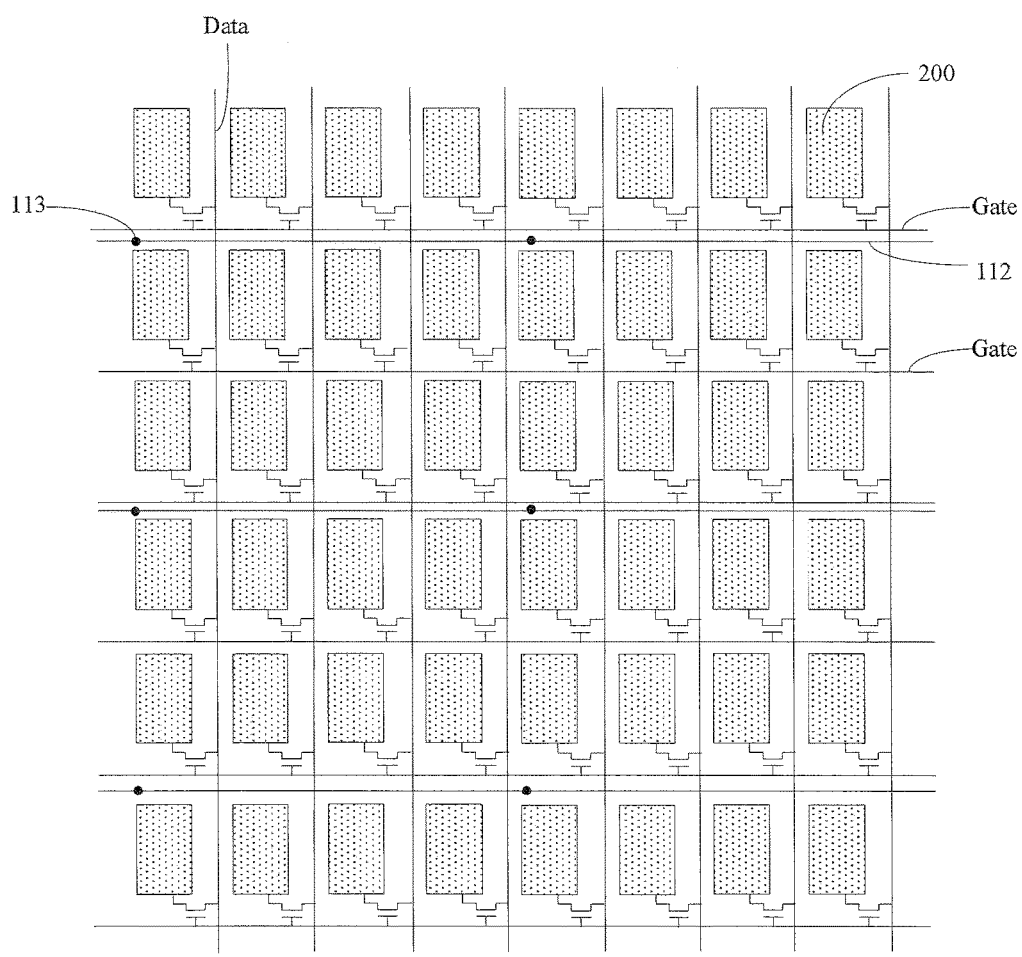
FIG. 2a is a principle schematic diagram showing an arrangement of pixel units of the In-Cell touch screen according to a first exemplary embodiment of the present invention.
Figure 2B:
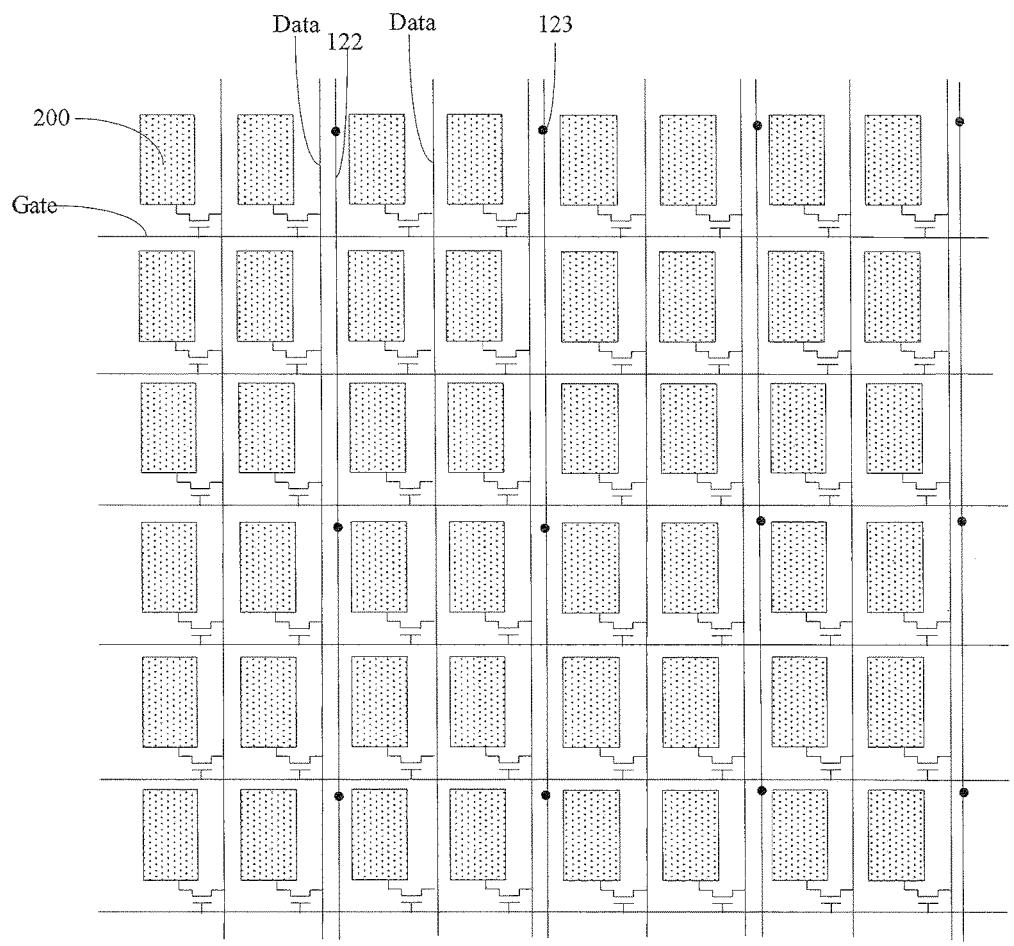
FIG. 2b is a principle schematic diagram showing an arrangement of pixel units of the In-Cell touch screen according to a second exemplary embodiment of the present invention.

In the above In-Cell touch screen according to an embodiment of the present invention, as shown in FIG. 2a and FIG. 2b, a plurality of pixel units 200 are formed and arranged in a matrix on the array substrate in the In-Cell touch screen. In FIG. 2a, the first touch electrodes or the second touch electrode may be arranged to extend in a row direction of the pixel units 200; in FIG. 2b, the first touch electrodes or the second touch electrode may be arranged to extend in a column direction of the pixel units 200 (the first touch electrodes and the second touch electrodes are not shown in FIG. 2a and FIG. 2b).

Generally, a touch screen has a precision at a millimeter level. The densities and widths of the first touch electrodes and the second touch electrodes may be selected according to the desired touch precision. The widths of the first touch electrodes and the second touch electrodes are usually set in a range of 5-7 mm. Meanwhile, the sizes of pixel units in a display screen are generally at a micrometer (μm) level, thus, one first touch electrode comprising a plurality of sub-squares or one second touch electrode comprising a plurality of sub-squares will generally cover a plurality of rows or columns of pixel units formed on the array substrate, and each sub-square corresponds to one pixel unit. The precision referred to in embodiments of the present invention means a precision in size of a touch unit of the touch screen or a pixel unit of the display screen.

In the above In-Cell touch screen provided according to a first exemplary embodiment of the present invention, as shown in FIG. 1a, the first touch electrode 110 may be comprised of a plurality of first touch sub-electrodes 111 which are independent of each other and arranged to alternate with the second touch electrodes 120; and a plurality of the first touch sub-electrodes 111, which belong to the same one first touch electrode 110 and are located on two sides of the second touch electrode 120 are electrically connected with each other by first bridging lines 112. Further, since the first bridging lines 112 and the plurality of first touch sub-electrodes 111 are located in different layers, they may be connected to each other via through holes 113, and the first bridging lines 112 and the second touch electrodes 120 are insulated from each other.

In the above In-Cell touch screen provided according to a second exemplary embodiment of the present invention, as shown in FIG. 1b, the second touch electrode 120 may be comprised of a plurality of second touch sub-electrodes 121 which are independent of each other and arranged to alternate with the first touch electrodes 110; and a plurality of the second touch sub-electrodes 121, which belong to the same one second touch electrode 120 and are located on two sides of the first touch electrode 110 are electrically connected with each other by second bridging lines 122. Further, since the second bridging lines 122 and the plurality of second touch sub-electrodes 121 are located in different layers, they may be connected to each other via through holes 123, and the second bridging lines 122 and the first touch electrodes 110 are insulated from each other.

In one exemplary embodiment, when the first touch electrode is used as the touch drive electrode, after bridging the first touch sub-electrodes composing the same one first touch electrode through the first bridging lines, a touch scan signal may be inputted to the plurality of first touch sub-electrodes through one signal line; alternatively, signal lines may be provided for first touch sub-electrodes composing the same one first touch electrode respectively, so that touch scan signals are respectively inputted to the plurality of first touch sub-electrodes, which is not limited herein.

In one exemplary embodiment, when the second touch electrode is used as the touch drive electrode, after bridging the second touch sub-electrodes composing the same one second touch electrode through the second bridging lines, a touch scan signal may be inputted to the plurality of second touch sub-electrodes through one signal line; alternatively, signal lines may be provided for the second touch sub-electrodes composing the same one second touch electrode respectively, so that touch scan signals are respectively inputted to the plurality of second touch sub-electrodes, which is not limited herein.

In the above In-Cell touch screen provided according to the first exemplary embodiment of the present invention, when the first touch electrode is comprised of the plurality of first touch sub-electrodes 111 independent of each other, and the black matrix is located on one side of the array substrate facing the opposed substrate, as shown in FIG. 2a, the array substrate may further comprise gate lines Gate extending in the row direction of the pixel units 200; and an extending direction of the first bridging lines 112 is the same as that of the gate lines Gate.

It should be noted that the first bridging lines and the first touch electrodes provided in the first embodiment of the present invention are located in different layers, thus, the first bridging lines may be provided between two adjacent insulated film layers.

Figure 3:
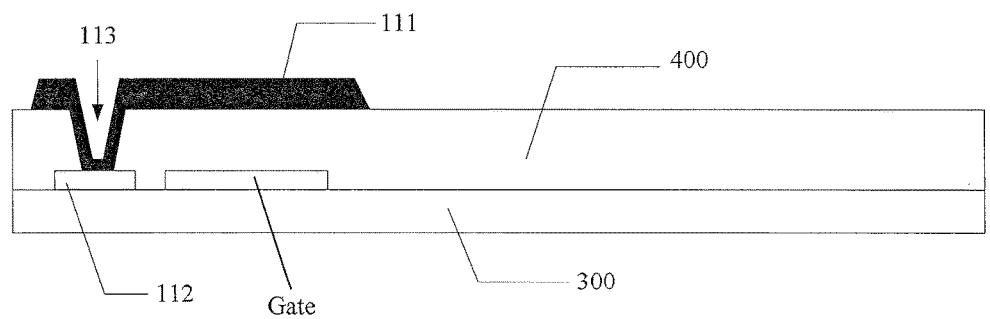
FIG. 3 is a partial cross-sectional view of an In-Cell touch screen according to the present invention.

In the above In-Cell touch screen provided according to the first exemplary embodiment of the present invention, the first bridging lines 112 and the gate lines Gate are arranged in the same layer, as shown in FIG. 3, in order to simplify manufacturing processes and save manufacturing costs. As such, no additional manufacturing step is required when manufacturing the array substrate, and patterns of the first bridging lines and the gate lines may be formed through only one patterning process, enabling reduced manufacturing cost.

In the above In-Cell touch screen provided according to the first exemplary embodiment of the present invention, as shown in FIG. 1a, FIG. 2a and FIG. 3, the first bridging lines 112 provided on the substrate 300 and the first touch sub-electrodes 111 provided on a film layer 400 may be electrically connected to each other via through holes 113 formed in the film layer 400. The film layer 400 is provided between the first touch sub-electrodes 111 and the first bridging lines 112. The gate lines Gate are also provided on the substrate 300.

Further, in order that an aperture ratio is not decreased by the first bridging lines connecting the respective first touch sub-electrodes, the first bridging lines are generally provided to be coincided with the pattern of the black matrix, that is, orthographic projections of the first bridging lines on the base substrate are located within a region where the pattern of the black matrix is located.

In the above In-Cell touch screen provided according to the second exemplary embodiment of the present invention, when the second touch electrode is comprised of the plurality of second touch sub-electrodes independent of each other, and the black matrix is located on one side of the array substrate facing the opposed substrate, as shown in FIG. 2b, the array substrate may further comprise data lines Data extending in the column direction of the pixel units 200; and an extending direction of the second bridging lines 122 is the same as that of the data lines Data.

It should be noted that the second bridging lines and the second touch electrodes provided in the second embodiment of the present invention are located in different layers, thus, the second bridging lines may be provided between two adjacent insulated film layers.

In the above In-Cell touch screen provided according to the second exemplary embodiment of the present invention, the second bridging lines and the data lines may be arranged in the same layer, in order to simplify manufacturing processes and save manufacturing costs. As such, no additional manufacturing step is required when manufacturing the array substrate, and patterns of the second bridging lines and the data lines may be formed through only one patterning process, enabling reduced manufacturing costs.

In the above In-Cell touch screen provided according to the second exemplary embodiment of the present invention, as shown in FIG. 1b and FIG. 2b, the second bridging lines 122 and the second touch sub-electrodes 121 may be electrically connected to each other via through holes 123, which is not limited herein.

Further, in order that an aperture ratio is not decreased by the second bridging lines connecting the respective second touch sub-electrodes, the second bridging lines are generally provided to be coincided with the pattern of the black matrix, that is, orthographic projections of the second bridging lines on the base substrate are located within a region where the pattern of the black matrix is located.

Specifically, the above In-Cell touch screen provided according to the above various embodiments of the present invention may be applied in a liquid crystal display screen, or may also be applied in an organic electroluminescence display screen, which is not limited herein.

Specifically, when applied in the liquid crystal display screen, the liquid crystal display screen may be an In-Plane Switch (IPS) type display screen which can achieve a wide angle of view, and may also be an Advanced Super Dimension Switch (ADS) liquid crystal display screen, which is not limited herein.

Specifically, when applied in the organic electroluminescence display screen, the organic electroluminescence display screen may achieve full color display by the organic electroluminescent structures which emit light of various colors, or by color filters, which is not limited herein.

Further, in the above In-Cell touch screen provided according to the above embodiments of the present invention, when it is required to provide color filters, the color filters may be located on one side of the array substrate facing the opposed substrate; of course, the color filters may be located on one side of the opposed substrate facing the array substrate, which is not limited herein.

Further, in the above In-Cell touch screen provided according to the embodiments of the present invention, the touch function and display function may be achieved in a simultaneous driving manner, that is, while gate scan signals are applied to the gate lines, simultaneously, touch scan signals are applied to the first touch electrodes and the second touch electrodes are coupled with the touch scan signals and output touch sensing signals, or touch scan signal are applied to the second touch electrodes and the first touch electrodes are coupled with the touch scan signals and output touch sensing signals.

When the touch function and display function are achieved in the simultaneous driving manner, it is preferable that the first touch electrodes extending in the same direction as the extending direction of the gate lines are selected as the touch drive electrodes, and when the gate scan signals are applied to the gate lines, while applying a gate scan signal to one gate line which is closest to one of the first touch electrodes, a touch scan signal is applied to the first touch electrode, and the second touch electrode are coupled with the touch scan signal and output touch sensing signal.

In the above In-Cell touch screen provided according to embodiments of the present invention, the touch function and display function may also be achieved in a time-division driving manner in order to reduce signal interference, that is, a time period during which the In-Cell touch screen displays one frame of picture is divided into a touch time period and a display time period, and in the touch time period, the first touch electrodes are applied with touch scan signals, and second touch electrodes are coupled with the touch scan signals and output touch sensing signals, or the second touch electrodes are applied with touch scan signals, and first touch electrodes are coupled with the touch scan signals and output touch sensing signals. Use of the time-division driving manner can reduce interference between display operations and touch operations, and improve picture quality and touch accuracy.

Figure 4:
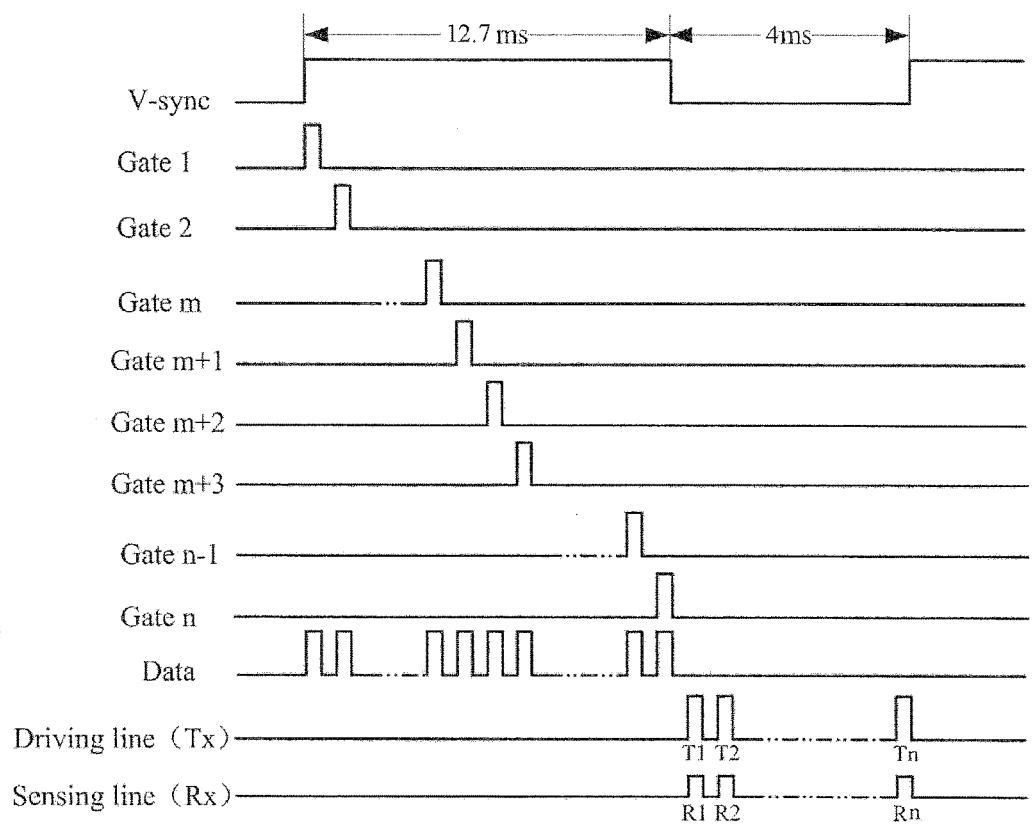
FIG. 4 is a timing diagram of a touch function achieved by using an In-Cell touch screen according to the present invention.

Specifically, for example, in the driving timing diagram shown in FIG. 4, a time period for which the In-Cell touch screen displays one frame (V-sync) is divided into a display time period (Display) and a touch time period (Touch). For example, in the driving timing diagram shown in FIG. 4, a time period for which the touch screen displays one frame is 16.7 ms, in which 4 ms is the touch time period, and the rest 12.7 ms is the display time period. Of course, the lengths of the two time periods may be adjusted according to a processing capacity of an IC chip, which is not particularly limited herein. In the display time period (Display), gate scan signals are applied to respective signal lines Gate1, Gate2 . . . Gaten in the touch screen in order, and gray scale signals are applied to data signal lines Data so as to perform the display function. In the touch time period (Touch), touch scan signals T1, T2 . . . Tn are respectively supplied to the respective touch drive electrodes Tx by the IC chip connected with the touch drive electrodes Tx, and meanwhile, the touch sensing signals R1, R2 . . . Rm are sensed by the touch sensing electrodes Rx, thereby performing the touch function. In the display time period, no signal is inputted to the touch drive electrodes and the touch sensing electrodes in the touch screen. In the touch time period, no signal is inputted to the gate signal lines and the data signal lines in the touch screen.

Based on the same inventive concept, embodiments of the present invention also provide a display apparatus comprising the above In-Cell touch screen provided according to any one of the above embodiments of the present invention. The display apparatus may be a mobile phone, a tablet computer, a TV, a display, a laptop, a digital photo frame, a navigator, or any product or component having a display function. Other necessary constituting parts of the display apparatus are obvious to those skilled in the art, and thus are not described herein. Regarding embodiments of display apparatus, please refer to the embodiments of the In-Cell touch screen as described above, and repeated description thereof are omitted.

The embodiments of the present invention provide an In-Cell touch screen and a display apparatus. In the In-Cell touch screen, the black matrix is divided into the first touch electrodes and the second touch electrodes arranged to be insulated from each other and alternate with each other, that is, the black matrix has the function of the first touch electrodes and the second touch electrodes. Since the touch function is achieved in the touch screen provided according to the embodiments of the present invention by the arrangement of the black matrix, the touch screen can be manufactured by using existing manufacturing processes for the array substrate or opposed substrate, without any additional process, thereby saving manufacturing cost and improving production efficiency. Further, since no separate touch electrode made of ITO material is required, and a pattern of the black matrix is provided in a non-opening region of the pixels, the light transmittance of the display apparatus can be prevented from being adversely affected by the touch electrodes. Further, in the In-Cell touch screen provided according to the embodiments of the present invention, since the first touch electrodes and the second touch electrodes are formed by dividing the black matrix, a direct facing area can be avoided between the first touch electrodes and the second touch electrodes in a thickness direction of the touch screen. As such, the mutual capacitance formed by the direct facing area is reduced, so that a proportion of an amount of change in the mutual capacitance, which change is caused by a finger touch operation, is increased, and a touch sensitivity of the In-Cell touch screen is improved.

It is apparent that the person skilled in the art may make various changes and modifications to these embodiments without departing from the principles and spirit of the disclosure, and these changes and modifications also fall within the scope of claims and equivalent thereof.

What is claimed is:

1. An In-Cell touch screen, comprising:
an array substrate, a plurality of pixel units arranged in an array being provided on the array substrate, the array substrate comprising:
a substrate;
a film provided on the substrate;
a conductive black matrix provided on the film;
a plurality of pixel units arranged in an array
a plurality of gate lines extending in the row direction of pixel units; and
a plurality of data lines extending in the column direction of pixel units;
an opposed substrate arranged to be opposed to the array substrate;
wherein, the black matrix comprises a plurality of first touch electrodes and a plurality of second touch electrodes arranged to be insulated from each other and alternate with each other, one of the first touch electrode and the second touch electrode is applied with a touch scan signal, and the other of the first touch electrode and the second touch electrode is coupled with the touch scan signal and outputs a touch sensing signal;
the black matrix itself serves as the first touch electrode and the second touch electrode; and
the plurality of first touch electrodes are arranged in a row direction of pixel units, and the plurality of second touch electrodes are arranged in a column direction of pixel units,
wherein each of the plurality of first touch electrodes arranged in the row direction of pixel units includes a plurality of first touch sub-electrodes separated from each other, each of the plurality of second touch electrodes arranged in the column direction of pixel units includes a single second touch electrode and in the row direction of pixel units, the first touch sub-electrodes of each first touch electrode are respectively located on two sides of each single second touch electrode and electrically connected via a first bridging line, the first bridging line and the gate lines are arranged between the substrate and the film, and each of the first touch sub-electrode is electrically connected with the first bridging line via a through hole formed in the film; or
wherein each of the plurality of second touch electrodes arranged in the column direction of pixel units includes a plurality of second touch sub-electrodes separated from each other, each of the plurality of first touch electrodes arranged in the row direction of pixel units includes a single first touch electrode; and in the column direction of pixel units, the second touch sub-electrodes of each second touch electrode are respectively located on two sides of each single first touch electrode and electrically connected via a second bridging line, the second bridging line and the data lines are arranged between the substrate and the film, and each the second touch sub-electrode is electrically connected with the second bridging line via a through hole formed in the film.

2. The In-Cell touch screen according to claim 1, wherein each first touch electrode and each second touch electrode have a mesh structure comprising a plurality of sub-squares respectively corresponding to a plurality of pixel units formed on the array substrate and arranged in a matrix.

3. The In-Cell touch screen according to claim 1, wherein the black matrix is located on the one side of the array substrate facing the opposed substrate;
   the array substrate further comprises gate lines extending in the row direction of the pixel units; and
   an extending direction of the first bridging line is the same as that of the gate lines.

4. The In-Cell touch screen according to claim 3, wherein the first bridging lines and the gate lines are arranged on the same layer.

5. The In-Cell touch screen according to claim 1, wherein the black matrix is located on the one side of the array substrate facing the opposed substrate;
   the array substrate further comprises data lines extending in the column direction of the pixel units; and
   an extending direction of the second bridging line is the same as that of the data lines.

6. The In-Cell touch screen according to claim 5, wherein the second bridging lines and the data lines are arranged on the same layer.

7. The In-Cell touch screen according to claim 1, further comprising color filters located on the one side of the array substrate facing the opposed substrate or on the one side of the opposed substrate facing the array substrate.

8. The In-Cell touch screen according to claim 1, wherein a time period during which the In-Cell touch screen displays one frame of picture is divided into a touch time period and a display time period, and during the touch time period, one of the first touch electrode and the second touch electrode is applied with a touch scan signal, so that the other of the first touch electrode and the second touch electrode is coupled with the touch scan signal and outputs a touch sensing signal.

9. A display apparatus, comprising the In-Cell touch screen according to claim 1.

10. The display apparatus according to claim 9, wherein each first touch electrode and each second touch electrode have a mesh structure comprising a plurality of sub-squares respectively corresponding to a plurality of pixel units formed on the array substrate and arranged in a matrix.

11. The display apparatus according to claim 9, wherein the black matrix is located on the one side of the array substrate facing the opposed substrate;
   the array substrate further comprises gate lines extending in the row direction of the pixel units; and
   an extending direction of the first bridging line is the same as that of the gate lines.

12. The display apparatus according to claim 11, wherein the first bridging lines and the gate lines are arranged on the same layer.

13. The display apparatus according to claim 9, wherein the black matrix is located on the one side of the array substrate facing the opposed substrate;
   the array substrate further comprises data lines extending in the column direction of the pixel units; and
   an extending direction of the second bridging line is the same as that of the data lines.

14. The display apparatus according to claim 13, wherein the second bridging lines and the data lines are arranged on the same layer.

* * * * *